United States Patent [19]

Okuhara

[11] Patent Number: 4,661,356

[45] Date of Patent: Apr. 28, 1987

[54] PRODUCTION OF VINEGER WITH BACTERIA ON A SUPPORT

[75] Inventor: Akira Okuhara, Kashiwa, Japan

[73] Assignee: Kikkoman Corporation, Noda, Japan

[21] Appl. No.: 676,093

[22] Filed: Nov. 29, 1984

[30] Foreign Application Priority Data

Nov. 30, 1983 [JP] Japan ................................ 58-224453

[51] Int. Cl.$^4$ .......................... C12J 1/00; C12P 7/54
[52] U.S. Cl. ...................................... 426/17; 435/140; 435/180
[58] Field of Search .................. 426/17; 435/140, 313, 435/174, 180, 161, 162

[56] References Cited

U.S. PATENT DOCUMENTS

| | | | |
|---|---|---|---|
| 3,880,716 | 4/1975 | Engelbart et al. | 435/140 |
| 4,127,447 | 11/1978 | Griffith et al. | 435/180 |
| 4,155,813 | 4/1979 | Barker et al. | 426/17 |
| 4,342,834 | 8/1982 | Wood et al. | 435/180 |
| 4,371,612 | 2/1983 | Matsumoto et al. | 435/180 |
| 4,547,463 | 10/1985 | Sakata et al. | 435/180 |

FOREIGN PATENT DOCUMENTS

| | | | |
|---|---|---|---|
| 15475 | of 1894 | United Kingdom | 426/17 |
| 781584 | 8/1957 | United Kingdom | 426/17 |

*Primary Examiner*—David M. Naff
*Assistant Examiner*—William J. Herald
*Attorney, Agent, or Firm*—Banner, Birch, McKie and Beckett

[57] ABSTRACT

A process for producing vinegar is carried out by inoculating and growing acetic acid bacteria on a lipophilic fibrous support packed in a fermentation tower, and forcing a charging wort for vinegar production and an oxygen-containing gas to contact with and pass through said bacteria on the support to carry out acetic fermentation. The fiberous support is preferably fibers of polypropylenes, polyethylenes, polystyrenes, polyethyleneterephthalate or polyurethanes.

4 Claims, 2 Drawing Figures

PRODUCTION OF VINEGER WITH BACTERIA ON A SUPPORT

BACKGROUND OF THE INVENTION

1. Field of the Invention

This invention relates to a process for producing vinegar which enables effective and stable production of vinegar of high concentration and high quality.

2. Description of the Prior Art

There has hitherto been known a process for producing vinegar which comprises packing curled wood shavings and the like in a fermentation tower, inoculating and growing acetic acid bacteria thereon, supplying a charging wort for vinegar production from the upper part of the tower, and fermenting the wort while it is being dispersed and let flow down naturally in the tower, and after completion of the fermentation, taking out the whole or a part of the vinegar as the product, replenishing with the same amount of the charging wort as that of the product taken out above, and repeating the flow-down fermentation as mentioned above. This process is called as trickling method.

However, the above process has disadvantages in that the acetic acid bacteria which have been inoculated and grown on the shavings and the like exhibit a low efficiency in acetic acid fermentation, necessitating a large-sized equipment; the equipment is liable to be contaminated with harmful organisms; the efficiency in acetic fermentation decreases with elapse of time; so that a vinegar of high concentration and high quality cannot be stably obtained.

SUMMARY OF THE INVENTION

The present inventors have made extensive studies to develop a process for producing vinegar which is free from disadvantages mentioned above and, as a result, accomplished the present invention.

The object of this invention is to provide a process for producing vinegar which enables effective and stable production of a vinegar of high concentration and high quality.

According to the present invention, there is provided a process for producing vinegar which comprises inoculating and growing acetic acid bacteria on a lipophilic fibrous support packed in a fermentation tower, forcing a charging wort for vinegar production and an oxygen-containing gas to contact with and pass through said bacteria on the support to carry out acetic fermentation.

BRIEF DESCRIPTION OF THE DRAWINGS

In the attached drawings.

Figure 1:
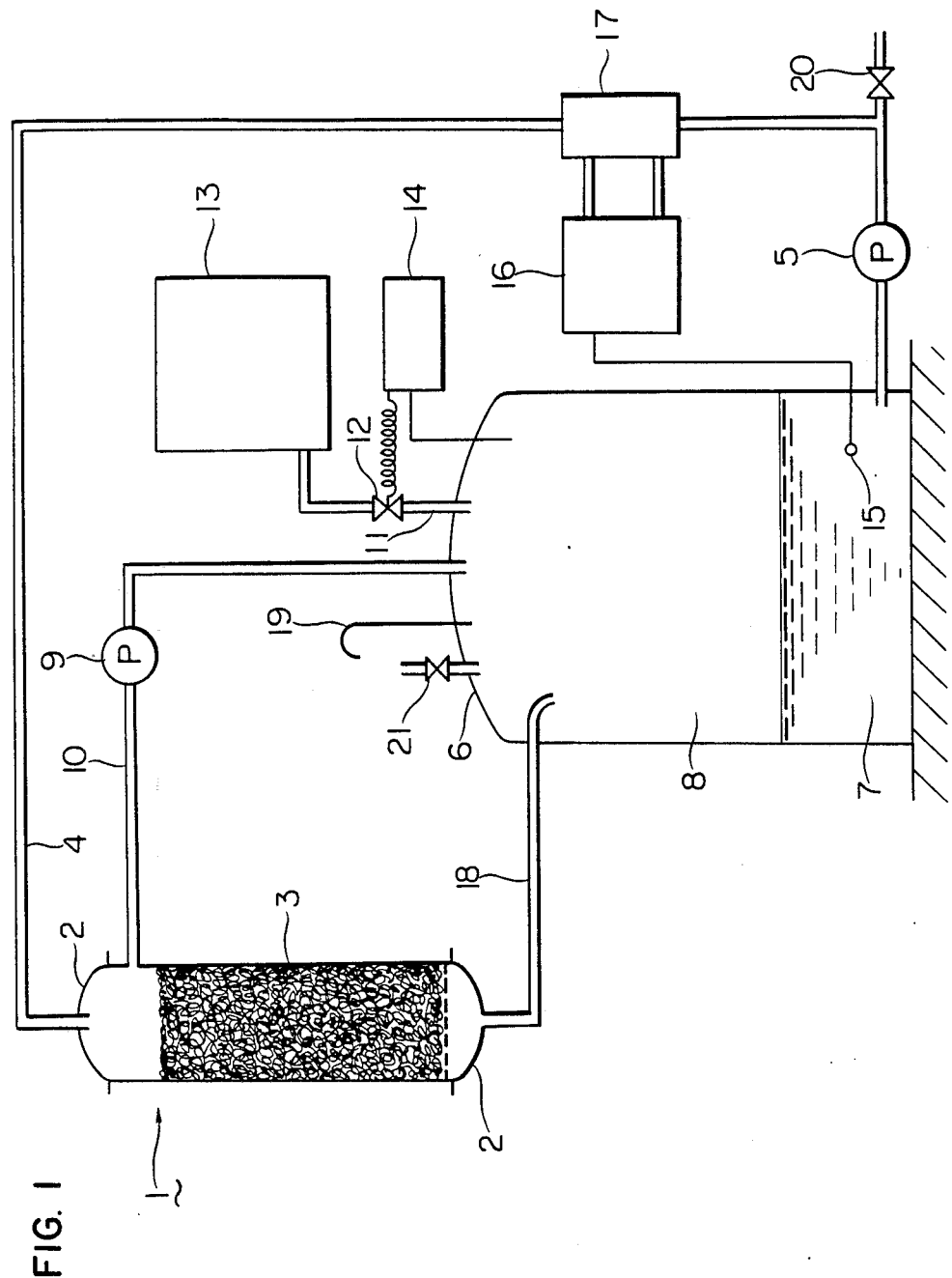
FIGS. 1 and 2 are respectively a schematic vertical sectional view illustrating a system for producing vinegar used in Examples of the present invention. The meanings of the numerals in the Figures are as follows.

1-fermentation tower, 2-cover, 3-lipophilic fibrous support, 4-wort recycling pipe, 5-liquid conveying pump, 6-gas-liquid separation tank, 7-liquid phase part, 8-gas phase part, 9-gas blower, 10-oxygen-containing gas supplying pipe, 11-gas supplying pipe, 12-control valve, 13-oxygen supplying apparatus, 14-oxygen concentration controlling apparatus, 15-temperature sensing element, 16-temperature controlling apparatus, 17-heat exchanger, 18-discharge pipe, 19-pressure regulating apparatus, 20-discharge value, 21-charging wort inlet, 22-vacuum pump, 23-vacuum pipe.

DETAILED DESCRIPTION OF THE INVENTION

This invention will now be illustrated in more detail below.

The lipophilic fibrous supports used in the present invention are piled bodies of synthetic resins that are highly lipophilic, namely easily come into intimate contact with oil, which have been formed into fibers to have a large surface area, and include cloth-formed (e.g. gauge), cotton-like or sponge-like ones or those of non-woven fabric structure. Many of them are generally used also as oil adsorbents. Examples of materials for above-mentioned supports include polypropylenes such as atactic polypropylene, isotactic polypropylene, propyleneethylene block copolymer, and propyleneethylene random copolymer; polyethylenes such as high-pressure polyethylene, medium-and low-pressure polyethylene, and ethylene-vinyl acetate copolymer; polystyrenes; polyesters; and polyurethanes (polyurethane foams). They may be used each alone or in combination thereof. The diameter of fibers used is not specifically restricted but is preferably from 10 to 100 μm.

Specific examples of the lipophilic fibrous support include LEOMAT (atactic polypropylene, mfd. by Sumitomo Chemical Co. Ltd.), WOSEP (isotactic polypropylene, mfd. by Toray, Co.), OILEEVA (isotactic polypropylene, mfd. by Daiwa Spinning, Co.), HIGHSEPARE (isotactic polypropylene, mfd. by Chisso, Co.), TOUGHNEL OIL BLOTTER (isotactic polypropylene, mfd. by Mitsui Petrochemical Co.), PETREL (isotactic polypropylene, mfd. by Mitsubishi Rayon, Co.), OIL SORBENT (polypropylene, mfd. by Sumitomo 3M, Inc.), OLSORB (polystyrene, mfd. by Teijin Co.) and TETORON fibers (polyethyleneterephthalate, mfd. by Teijin Co.).

It is extremely important in this invention to use the lipophilic fibrous support. The effective and stable production of a vinegar of high concentration and quality cannot be achieved by using the previously known hydrophilic vegetable supports including the wood shavings or the like and chaff. Namely, the lipophilic fibrous supports used in the present invention have a very advantageous property for producing vinegar in that useful acetic acid bacteria is easily inoculated and grown thereon, whilst harmful miscellaneous bacteria do so difficulty. Accordingly, the acetic acid bacteria which have been once inoculated and grown on said supports can continue to grow actively. In the case of hydrophilic vegetable supports, on the other hand, since useful acetic acid bacteria are difficult to inoculate and grow on the supports whereas harmful miscellaneous bacteria do so easily, the acetic acid bacteria which have been once somehow inoculated and grown on the support decrease gradually in number with elapse of time and miscellaneous bacteria come to grow taking the place of them. So that, an effective and stable production of a vinegar of high concentration cannot be achieved.

There is no limitation as to shape of the fermentation tower to be packed with the support, but it is preferably of a cylindrical type. They may also be used in plural numbers connected in series or in parallel.

As to the method for inoculating and growing acetic acid bacteria on the above-mentioned support, any suitable method may be used. There may be mentioned, as an example, a method which comprises compulsorily introducing the charging wort inoculated with acetic acid bacteria together with an oxygen-containing gas from the upper or lower part of the fermentation tower, bringing the wort and the oxygen-containing gas into contact with the support, introducing again to the upper or lower part of the tower the effluent wort and gas after regulating respectively the temperature and the oxygen concentration thereof, and conducting continuously the above-mentioned operations.

According to the above-mentioned method, it is possible to grow on said support a sufficient amount of acetic acid bacteria in a period of 15 to 20 hours. The completion of the growth of acetic acid bacteria can also be noticed from the increase in acidity of the wort flowing out of the tower or the increase in the oxygen consumption rate.

The acetification efficiency of the fermentation tower packed with the support on which acetic acid bacteria have been grown is extremely high. The efficiency in acetification per unit volume of fermentor (fermentation tower) sometimes reaches more than ten times that obtainable in prior submerged aeration-agitation fermentation. Also, by using the above support, it is possible to suppress the contact of the oxygen-containing gas with the wort to the required minimum. As a result, the time of contact between the oxygen-containing gas and the wort is short and unnecessary oxidation does not take place. Consequently, a large amount of vinegar of high quality can be produced in a fixed period of time by using a small-sized equipment.

As to the charging wort for vinegar production used herein, mention may be made of those worts which are prepared according to conventional method of producing vinegar. Specific examples thereof include those which are obtained by using, as the main raw material, a mixed solution or the like prepared by incorporating nutriments for acetic acid bacteria (e.g. SAKE-lees infusion, malt infusion, yeast extract, sugars, and inorganic salts) into alcohol-containing brewed products obtained from starch-containing material such as cereals and potatoes by saccharification followed by alcoholic fermentation, liquors such as Japanese SAKE or wine, and alcohol, adding to the alcohol-containing brewed products a small amount of acetic acid or a vinegar mash obtained at the completion of fermentation to prevent the contamination with miscellaneous bacteria and, optionally, further inoculating it with acetic acid bacteria or culture fluid thereof.

As said acetic acid bacteria, anything may be used so far as they are bacteria belonging to Genus Acetobacter and having an ability to oxidize ethanol and to produce acetic acid. Examples of said bacteria include Acetobacter aceti, A. pasteurianus, A. peroxydans, and the like.

The process of forcing the wort as well as an oxygen-containing gas to contact with and pass through the support in the fermentation tower may be conducted as follows. The wort and the oxygen-containing gas are compulsorily introduced under application of pressure by means of a pump or the like into the upper or lower part of the fermentation tower, which has been packed with the support, in such a way that the wort may penetrate rapidly into the support without staying in said part, forming finely dispersed flow of the wort and the oxygen-containing gas in the tower, thereby effecting sufficient, successive contact thereof with the support (see FIG. 1). The acetic fermentation may also be conducted by keeping the lower space of the fermentation tower under reduced pressure concurrently with the introduction of the wort into the fermentation tower packed with the support, thereby drawing the wort and the oxygen-containing gas into the tower by suction to form a finely dispersed flow, and thus effecting sufficient, successive contact of the wort and gas with the support in the fermentation tower (see FIG. 2).

The wort which has been flowed out from the lower part of the fermentation tower is recycled into the fermentation tower together with oxygen-containing gas. This operation is continued until completion of the fermentation. The oxygen concentration in the gas is measured and controlled by an oxygen concentration controlling apparatus and a necessary amount of oxygen is supplied so as to keep the concentration in the range of 5 to 60%. Outside this concentration range the acetic acid fermentation cannot be conducted effectively.

As the oxygen-containing gas, there may be used air, mixtures of air with oxygen, mixtures of oxygen with other inert gases, or the like.

The circulation rate of the wort and the oxygen-containing gas may vary depending on the size and the shape of the fermentation tower or the kind of the supports but are 5 ml to 5 l /min·l of fermentor and 1 to 50 l /min·l of fermentor, respectively.

The temperature of circulating wort to carry out acetic fermentation is 25° to 40° C., preferably 28° to 38° C.

Thus, the wort and the gas in the fermentation tower contact thoroughly in suitable flow rate with acetic acid bacteria which have been inoculated and grown on the support, whereby acetic fermentation is effected and the alcohol in the wort is converted into acetic acid.

At the completion of acetic fermentation, vinegar produced is taken out from the gas-liquid separation tank and, according to a conventional process for producing vinegar, subjected to aging, filtration, adjustment of the composition to conform to the specification, and then sterilization to obtain the final product.

It is important in the present invention to introduce the wort and the oxygen-containing gas compulsorily into the fermentation tower. The supports used in the present invention are highly water-repellent, come very difficultly into intimate contact with water and are difficultly penetrated with wort. So that it is difficult to pass the wort through the support at a desirable rate unless it is compulsorily introduced. Further, since a vast amount of oxygen is required in the conversion of alcohol into acetic acid by acetic fermentation and in the growing of acetic acid bacteria, unless oxygen-containing gas is introduced compulsorily, deficiency of oxygen will take place in the fermentation tower, which causes not only a decrease in the acetification ability of the support on which acetic acid bacteria have been grown but also a danger of death of acetic acid bacteria.

When columns of considerable length or plural columns connected in series are used as the fermentation tower, it is preferable to supply oxygen-containing gas at the intermediate point of the column or the connecting part thereof so that the deficiency of oxygen may not occur within the column.

An example of the system of this invention is illustrated below with reference to the drawings attached and further the process for producing vinegar by the use of said system is illustrated to explain this invention in more detail.

FIG. 1 shows a schematic vertical sectional view illustrating a concrete example of the system for producing vinegar according to the present invention. Numeral 1 is a closed-type, cylindrical fermentation tower whose upper and lower openings have been closed with covers 2. A lipophilic fibrous support 3 on which acetic acid bacteria have been inoculated and grown is packed in the tower. The tower may be provided on the outside with a jacket for temperature regulation (not shown in the Figure). Numeral 4 is a wort recycling pipe provided with a liquid conveying pump 5 at a point along the line, of which one end is communicated with the upper part of the above-mentioned fermentation tower and the other end is communicated with the lower liquid-phase part (wort) 7 of a gas-liquid separation tank 6. Numeral 10 is a gas circulating pipe provided with a gas blower 9 at a point along the line, of which one end is communicated with the upper part of the said fermentation tower 1 and the other end is communicated with the upper gas-phase part 8 of the said gas-liquid separation tank 6. Numeral 11 is a gas supplying pipe, of which one end is communicated with the gas phase part of the said separation tank and the other end is communicated via a control valve 12 with an oxygen supplying apparatus 13. Numeral 14 is an oxygen concentration controlling apparatus, which is connected with the gas phase part 8 of the said separation tank and with the control valve 12 placed in the said gas supplying pipe, and is so constructed that it may measure the oxygen concentration of the gas phase in the said separation tank, convert the signal obtained by the sensor into an electric power output, open or close the said control valve 12 by the output, and automatically adjust the oxygen concentration of the gas phase in the said fermentation tower to a predetermined value. Numeral 15 is a temperature sensing element, which is connected with a temperature controlling apparatus 16 which controls temperature of the wort with a heat exchanger 17 placed in the said wort recycling pipe 4, and the whole system is so constructed that the wort in the said fermentation tower may be kept at the optimum temperature for fermentation of acetic acid bacteria. Numeral 18 is a discharge pipe, of which one end is communicated with the bottom of the said fermentation tank 1 and the other end is communicated with the gas phase part of the said gas-liquid separation tank 6. Numeral 19 is a pressure regulating apparatus and is so constructed that when the gas pressure in the gas phase part 8 of the said gas-liquid separation tank 6 has exceeded a predetermined pressure range, discharge of a part of the gas in said gas phase or incorporation of air into the gas phase may be occurred through the said pressure regulating apparatus 19. Numeral 20 is the discharge valve for the vinegar obtained. Numeral 21 is the inlet for charging wort.

Figure 2:
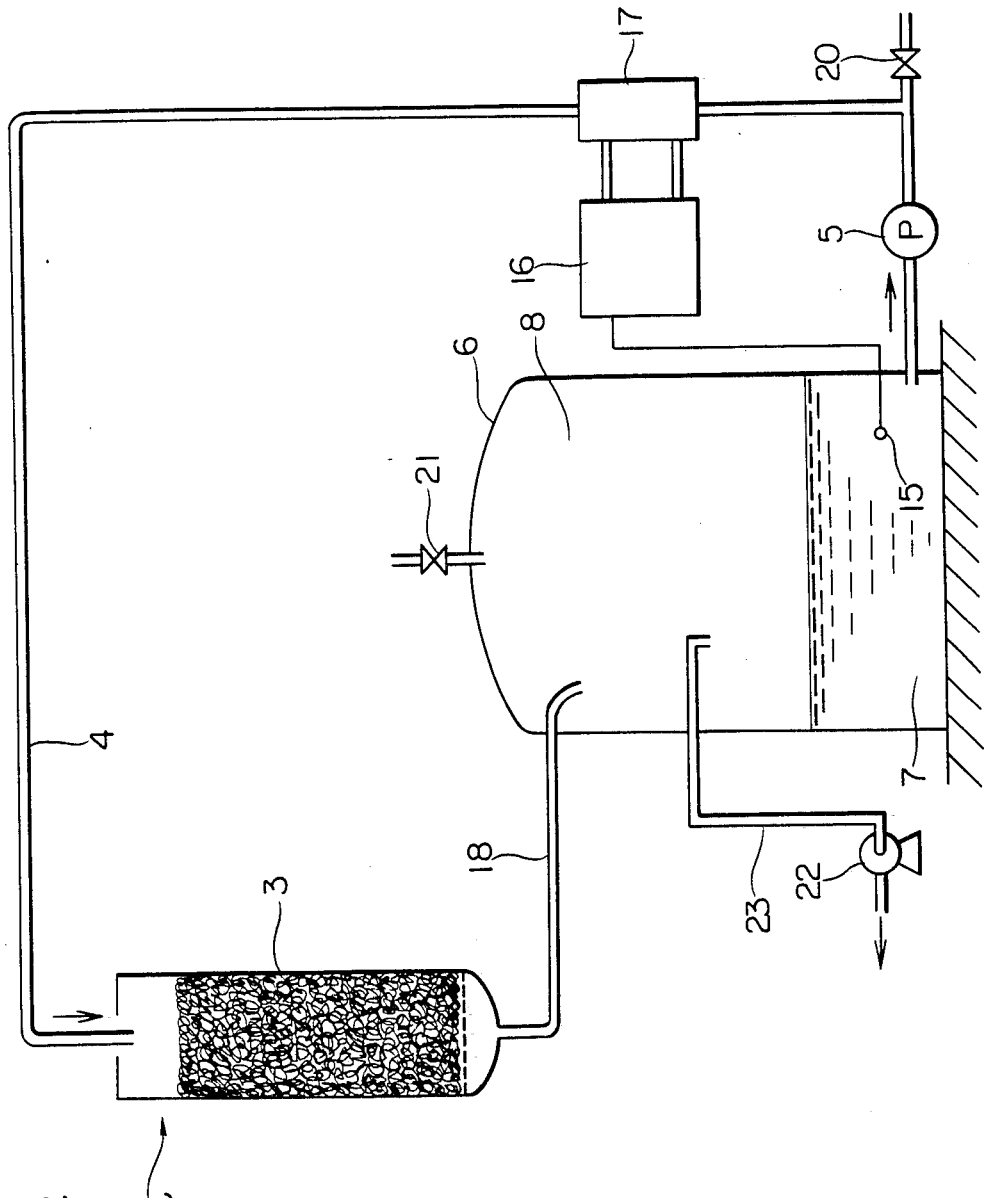

FIG. 2 shows a schematic vertical sectional view illustrating another concrete example of the system for producing vinegar according to the present invention. It is of exactly the same construction as that in above-mentioned FIG. 1 except that, in FIG. 1 above, the upper part of the fermentation tower 1 has been opened by removing the upper cover 2; the oxygen-containing gas supplying pipe 10, gas supplying pipe 11, oxygen concentration controlling apparatus 14 and the pressure control valve 19 have been removed and, in place of them, the suction port of a vacuum pipe 23 provided with a vacuum pump 22 has been communicated with the gas phase part 8 of the gas-liquid separation tank 6. According to this construction, since the gas-liquid separation tank is kept under reduced pressure, the wort for vinegar production supplied into the upper part of the fermentation tower 1 can be sucked in and passed through the support together with air.

As is apparent from the above description, according to the present invention a lipophilic fibrous support, which has a large surface area and on which acetic acid bacteria can easily be inoculated and grown, is utilized in acetic fermentation after it has been packed in a fermentation tower and on which acetic acid bacteria have been inoculated and grown; the growing environment of the acetic acid bacteria is maintained under favorable conditions for growth by compulsorily supplying a wort for vinegar production and an oxygen-containing gas. As the result, acetic acid bacteria is inoculated and grown in a large amount on the surface of the lipophilic fibrous support; the number of cells of acetic acid bacteria per unit volume of the support increases; the efficiency in acetic fermentation per unit volume of the fermentation tower packed with the support is highly enhanced; and thus a large amount of vinegar having a high concentration can be produced by use of a small fermentation tower in a short period of time. Further, since adhering and detaching of acetic acid bacteria to and from the support can be performed very easily, it is possible to keep the support always in a condition wherein acetic acid bacteria of a high activity have been inoculated and grown thereon. The acetic acid bacteria grown on the support have a long life and undergo without decrease in the efficiency in acetic fermentation with elapse of time, so that they can be repeatedly used batchwise or continuously. Particularly in batchwise use, the lag phase becomes short or almost unobservable from the second time; the acetic fermentation occurs in a short period when charging wort is supplied; further, even when the feed of wort is stopped for a time because of failure of the system or the like, the acetic acid bacteria do not die and initiate an active fermentation again when a wort is supplied again; thus the production of vinegar can be conducted in a stable manner.

Further, in the present invention, the wort is not contacted with gas bubbles or air vigorously for a long time as in prior submerged aeration-agitation process and trickling method; rather, acetic acid bacteria are contacted with a wort and oxygen-containing gas for a short time in the fermentation tower, and thus, while the direct contact of wort with air is being prevented to the utmost, only the acetic fermentation by acetic acid bacteria is made to proceed at a rate higher than that in a submerged aeration-agitation process. So that a high-quality vinegar which is highly tasteable in points of flavor, taste and overall aspect can be obtained without loosing the excellent flavor of the materials which constitutes the charging wort and without forming unpleasant smell and taste due to oxidation of the vinegar or wort caused by unnecessary contact of the wort with air.

This invention will be explained in more detail below with reference to Examples. In the Examples, an ethanol concentration was determined with a gas chromatographic method, and an acidity was determined by titrating 1 ml of sample with 0.1 N NaOH solution using phenolphthlenin as an indicator and calculated as acetic acid g/100 ml.

EXAMPLE 1

Vinegar was produced by using the system for vinegar production shown in FIG. 1.

A polyvinyl chloride pipe, 50 mm in inside diameter and 300 mm in length, was used as the fermentation tower. A 500 ml volume part of the polyvinyl chloride pipe was used to hold the support and was packed with TOUGHNEL OIL BLOTTER (mfd. by Mitsui Petrochemical Co.) used as the lipophilic fibrous support 3. There were used: a combination of a Digital Oxygen Meter, Type 62320 (mfd. by Mitaka Kogyo Co.) with a Yamatake Honeywell Controller 0–100% Type as the oxygen concentration controlling apparatus 14; a Shimaden SR-4000, 3-Position Controlling Apparatus as the temperature controlling apparatus 16; a Dimroth cooler as the heat exchanger 17, a glass tube of 1 mm in inside diameter and 200 mm in length as the pressure regulating apparatus 19; an Iwaki Magnetic Pump MD15 as the liquid conveying pump 5; an Air Pump, Highblow SSP-3EBS (mfd. by Takatsuki Denki Seisakusho Co.) as the gas blower 9; an oxygen cylinder (1500 liters) as the oxygen supplying apparatus 13; an Electric Valve V52 HDB23002 (mfd. by Skinner Co.) as the control valve 12; and 5 liters aspirator bottle as the gas-liquid separation tank 6. They were set up as shown in FIG. 1.

A charging wort having an acidity of 1.5% (W/V) and ethyl alcohol concentration of 5% (W/V) was prepared by using seed vinegar prepared by use of Acetobacter sp. 1 (obtained from the Fermentation Research Institute, Agency of Industrial Science and Technology, Japan), SAKE and water.

A 5 liters of the charging wort was introduced into the system by operating the liquid conveying pump 5 and was circulated at a rate of 800 ml/min through the system. Meanwhile, the gas in the gas phase was circulated at a rate of 3 l/min. through the system by operating the gas blower 9. When the oxygen concentration of the gas phase part 8 in the gas-liquid separation tank 6 decreased, oxygen gas was supplied through the gas supplying pipe 11 so as to keep the oxygen concentration in said gas phase at 15 to 23% (V/V). Thus, acetic fermentation was conducted while the wort temperature was being controlled at 29° to 31° C.

As a result, absorption of oxygen and increase in acidity began after a lag phase of about 15 hours, and the fermentation of the wort for vinegar production finished 40 hours after charging (25 hours after the lag phase) to give 4.8 liters of vinegar having an acidity of 7.4% and a residual alcohol concentration of 0.2%, corresponding to a yield of acetic acid of about 95% of the theoretical value. The remaining 0.2 liter of the vinegar was found retained in the system.

EXAMPLE 2

Example 1 was repeated but 1 liter of the vinegar was retained in the system and taken out after 3 days of idle operation. Then, 2.5 liters of the same charging wort as that used in Example 1 was introduced and thereafter the acetic fermentation was carried out in the same manner as in Example 1.

Absorption of oxygen and increase in acidity began after a lag phase of about 9 hours from the charging. The acidity of the wort reached 5% 27 hours and 30 minutes after the charging. Then, 1 liter portion of SAKE (alcohol concentration 12%) was fed into the system at a rate of 90 ml/hour to continue further the acetic fermentation. Resultantly, 3.5 liters of vinegar having an acidity of 9.7% and a residual alcohol concentration of 0.2% was obtained 47 hours after the charging.

COMPARATIVE EXAMPLE 1

An acetic fermentation was carried out in exactly the same manner as in Example 1 except that, in place of using the lipophilic fibrous support, Japanese cedar wood chips which had been immersed in boiling water for 30 minutes to effect sterilization and extraction of the water soluble substances were used after tightly packed in the tower.

As the result, absorption of oxygen and increase in acidity did not occur even after elapse of 24 hours from charging. Then, a second experiment was carried out by reducing the flow rate of wort in the fermentation tower from 800 ml/min. to 100 ml/min.. Absorption of oxygen and increase in acidity began about 24 hours after initiation of the second experiment and the acidity increased up to 5.3% after 52 hours. Thereafter, however, increase in acidity and absorption of oxygen stopped, and continuation of acetic fermentation became difficult.

Then, the wort for vinegar production was replaced with the same charging wort as described in Example 1, and fermentation was conducted again. Though the acidity then began to increase, it reached only 4.0% 30 hours after the charging and thereafter decreased with elapse of time down to 3.5% 48 hours after the charging.

The results obtained in Examples of the present invention and in Comparative Example described above reveal the following. In the process shown in Comparative Example, wherein acetic acid bacteria inoculated and grown on Japanese cedar wood chips were used, only a vinegar of 5.3% acidity was obtained in the first experiment of vinegar production; in the subsequent second vinegar production, only a wort of still lower acidity of 4.0% was obtained and the acidity rather decreased when the fermentation was continued for a long time. These results reveal that the process of Comparative Example cannot give a vinegar of high concentration or cannot give it continuously or repeatedly in a stable manner.

In contrast, the process of the present invention wherein acetic acid bacteria inoculated and grown on a lipophilic fibrous support were used, gave a high-concentration vinegar of 7.4% acidity in the first experiment of vinegar production and a vinegar of a still higher acidity of 9.7% in the second vinegar production conducted after several days of idle operation. These results reveal that the process of the present invention enables repeated, stable production of high concentration vinegar.

EXAMPLE 3

An acetic fermentation was carried out in exactly the same manner as in Example 1 except that WOSEP (mfd. by Toray Co.) was used as the lipophilic fibrous support, 2.5 liters of the same charging wort for vinegar production as that in Example 1 was used, and the flow rate of the wort and the gas supplying rate were respectively altered into 0.22 l/min. and 5 l/min.

As the result, absorption of oxygen began about 10 hours after the initiation of charging and the fermentation completed after 31 hours, yielding a vinegar of 7.5% acidity and 0.2% alcohol concentration.

Then, the vinegar obtained in this Example and the one prepared by conventional submerged aeration-agitation process (using the same raw materials) were respectively adjusted to acidity 5% and then subjected to sensory evaluation test conducted by a panel of twenty members, well-trained persons. The two samples were first discriminated by a triangle discrimination method. Then, those panelists who gave a right answer were asked to answer which sample is preferred by them from the overall aspect of flavor and taste.

The result are as shown in Table 1.

TABLE 1

|  | Right answerer in discrimination | Answerer who prefer the product |
|---|---|---|
| Process of this Example | 11 panelists* | 8 panelists* |
| Liquid aeration agitation |  | 3 panelists |

Note:
*Significant at 5% level.

The result shown in Table 1 reveals that the vinegar prepared according to the present invention is superior in flavor and taste and is of high quality as compared with that prepared by submerged aeration-agitation process.

EXAMPLE 4

Vinegar was produced by using the system for vinegar production as shown in FIG. 2.

The acetic fermentation was carried out by introducing 5 liters of the same charging wort as that used in Example 1 into the system by means of the liquid conveying pump 5, circulating the wort through the system at a rate of 800 ml/min., maintaining the gas phase part 8 under reduced pressure by operating the vacuum pump 21 at a gas-discharging rate of 3 l/min. and controlling the wort temperature at 29° to 31° C.

As the result, the fermentation finished about 42 hours after the charging (about 26 hours after lag phase) to give a vinegar having an acidity of 6.3% and an alcohol concentration of 0.2%.

EXAMPLE 5

In the system shown in Example 1, a column 5 cm² in cross-sectional area and 1 m in length provided with a jacket was used as the fermentation tower, and TOUGHNEL OIL BLOTTER (Mfd. by Mitsui Petrochemical Co.) was packed in the fermentation tower as the lipophilic fibrous support for acetic acid bacteria. Acetic acid bacteria were then inoculated and grown on the support in the same manner as in Example 1 mentioned above. Then 3 liters of a charging wort for vinegar production [acidity 1.8% (W/V), alcohol content 4.2% (W/V)] prepared by mixing SAKE, rice vinegar and water was circulated through the system at a rate of 20 ml/min. by means of a liquid conveying pump (Iwaki Metering Pump EP.C25). The gas in the gas phase was circulated through the system at a rate of 3 l/min. by means of a gas blower (Iwaki Air Pump AP-115N). The fermentation temperature was controlled at 29° to 31° C. by circulating warm water of 30° C. through the heat exchanger and the jacket and the oxygen concentration in the gas phase was controlled at 10 to 15% (V/V) by supplying air.

The acetic fermentation was carried out in the same manner as in Example 1 as to other conditions to give a vinegar of 6.9% acidity in about 33 hours.

EXAMPLE 6

The same apparatuses and support (100 g, 500 ml) as those in Example 1 were used except that a polyvinyl chloride pipe of 25 mm in inside diameter and 1000 mm in length was used as the fermentation tower. The pellicle of the same acetic acid bacteria as those used in Example 1 was inoculated to the upper part of the support. Three liters of a wort [acidity 1% (W/V), alcohol concentration 5% (W/V)] prepared by using SAKE, rice vinegar and water was charged as the charging wort into the gas-liquid separation tank. The wort and the gas in the gas phase were circulated through the system respectively at a rate of 20 ml/min. and 5.5 l/min. while the temperature of the charging wort was being controlled at 29° to 31° C. The oxygen concentration in the gas phase was regulated in the range of 14 to 20% by supplying a gas having an oxygen concentration of 60% (V/V). Oxygen absorption began after 11 hours and the fermentation completed after 40 hours. A 2.5 liters portion of the vinegar at the completion of fermentation (acidity 7.2%) was taken out from the system and 2.5 liters of a charging wort [alcohol concentration 6% (W/V)] prepared by using SAKE and water was newly charged into the gas-liquid separation tank. The wort and the gas were circulated in the system under the same conditions as described above, with initial acidity being 1.2% (W/V) and initial alcohol concentration being 5% (W/V). The fermentation finished after 30 hours, and the acidity of the vinegar at the completion of fermentation was 7.2%.

For the purpose of comparison, a fermentation was carried out by using an aeration-agitation tank (5 liters volume). A 2.5 liters volume of a charging wort (acidity 1%, alcohol concentration 5%) prepared by using SAKE, rice vinegar and water was charged into the tank and the fermentation was conducted at an agitation rate of 500 r.p.m. at 30° C. while air was being passed through the wort at a rate of 3 l/min. It took 65 hours to complete the fermentation. The final acidity of the vinegar was 7.3%. With continued aeration, a portion of 2.16 liters of the above vinegar was taken out and 2.16 liters of a charging wort prepared from SAKE and water (alcohol concentration 7%) was introduced into the fermentor. Fermentation was then conducted in the same manner as described above. After 37 hours a vinegar of 7% acidity was obtained.

The process of the present invention and the aeration-agitation process (Comparative Example) were compared with each other for acetic acid producing capacity, which was expressed as "fermentation ability" as calculated by the following equation.

$$\text{Fermentation ability} = \frac{10\left(\text{final acidity (\%)} - \text{initial acidity (\%)}\right) \times \left(\text{wort volume } (l)\right)}{\left(\text{fermentation tank volume } (l)\right) \times \left(\text{time required for completion of fermentation } (h)\right)}$$

The process of the present invention:

$$\frac{10(7.2 - 1.2) \times 3}{0.5 \times 30} = 12 \ (g/l \cdot h)$$

Aeration-agitation process:

$$\frac{10(7.0 - 1.6) \times 2.5}{5 \times 37} = 0.73 \ (g/l \cdot h)$$

As shown above, the process for producing vinegar according to the present invention exhibited an ability of more than 16 times that of the aeration agitation process, which has hitherto been regarded as the most advanced process.

What is claimed is:

1. A process for producing vinegar which comprises inoculating and growing acetic acid bacteria on lipophilic fibers of a synthetic resin selected from the group consisting of polypropylenes, polyethylenes, polystyrenes, polyethyleneterephthalate and polyurethanes packed in a fermentation tower, and forcing a charging wort for vinegar production and an oxygen-containing gas to contact with and pass through said bacteria on the lipophilic fibers to carry out acetic fermentation.

2. A process according to claim 1, wherein the oxygen concentration in the oxygen-containing gas is 5 to 60% (V/V).

3. A process according to claim 1, wherein the temperature of the acetic fermentation is 20° to 45° C.

4. A process according to claim 1, wherein the diameter of the support fiber is 10 to 100 $\mu$m.

* * * * *